United States Patent [19]
Green, II et al.

[11] 4,148,641
[45] Apr. 10, 1979

[54] PHOTOGRAPHIC PRODUCTS AND PROCESSES EMPLOYING NOVEL NONDIFFUSIBLE PYRIDYLAZOPYRAZOLE OR PYRIMIDYLAZOPYRAZOLE DYE-RELEASING COMPOUNDS

[75] Inventors: James A. Green, II, Chino, Calif.; Norman W. Kalenda, Rochester, N.Y.

[73] Assignee: Eastman Kodak Company, Rochester, N.Y.

[21] Appl. No.: 832,310

[22] Filed: Sep. 12, 1977

[51] Int. Cl.$^2$ .......................... G03C 7/00; G03C 5/54; G03C 1/40; G03C 1/10
[52] U.S. Cl. .......................................... 96/29 D; 96/3; 96/73; 96/77; 96/99
[58] Field of Search ...................... 96/3, 29 D, 73, 77, 96/99

[56] References Cited

U.S. PATENT DOCUMENTS

| | | | |
|---|---|---|---|
| 2,348,417 | 5/1944 | Proescher et al. | 260/149 |
| 2,495,244 | 1/1950 | Felix et al. | 260/202 |
| 2,830,042 | 4/1958 | Dittmar et al. | 260/146 |
| 2,938,895 | 5/1960 | Oesterlein | 260/146 |
| 3,081,167 | 3/1963 | Goulston et al. | 96/29 D |
| 3,097,196 | 7/1963 | Straley et al. | 260/146 |
| 3,196,014 | 7/1965 | Rogers | 96/29 D |
| 3,393,199 | 7/1968 | Stright | 260/155 |
| 3,563,739 | 2/1971 | Idelson | 96/29 D |

FOREIGN PATENT DOCUMENTS 1124882 7/1956 France.
1200358 12/1959 France.
899758 6/1962 United Kingdom.

Primary Examiner—Richard L. Schilling
Attorney, Agent, or Firm—Harold E. Cole

[57] ABSTRACT

Photographic elements, diffusion transfer assemblages and processes are described which employ a novel nondiffusible compound having a releasable pyridylazopyrazole or pyrimidylazopyrazole dye moiety. The compound contains in the ortho position of the azopyrazole moiety a metal chelating group, a salt thereof or a hydrolyzable precursor thereof, and a ballasted carrier moiety which is capable of releasing the diffusible azo dye under alkaline conditions. The dye is transferred imagewise to an image-receiving layer where it is contacted with metal ions to form a metal-complexed azo dye transfer image of excellent stability.

33 Claims, No Drawings

PHOTOGRAPHIC PRODUCTS AND PROCESSES EMPLOYING NOVEL NONDIFFUSIBLE PYRIDYLAZOPYRAZOLE OR PYRIMIDYLAZOPYRAZOLE DYE-RELEASING COMPOUNDS

This invention relates to photography and more particularly to color diffusion transfer photography employing certain nondiffusible azo dye-releasing compounds which, as a function of development of a silver halide emulsion layer, release a diffusible, metallizable, pyridylazopyrazole or pyrimidylazopyrazole dye. Highly stable metal complexes of this dye are formed in an image-receiving layer.

Azo dye developers containing metallizable groups are disclosed in U.S. Pat. Nos. 3,081,167; 3,196,014; 3,299,041; 3,453,107; and 3,563,739. Since it is a reactive species, however, the developer moiety of such dye developers is capable of developing any exposed silver halide emulsion layer that it comes into contact with, rather than just developing the adjacent silver halide emulsion with which it is associated. Unwanted wrong-layer development, therefore, can occur in dye developer systems which results in undesirable interimage effects. Accordingly, it is desirable to provide an improved transfer system in which the dye is not attached to a "reactive" moiety, such as a developer moiety, so that such dye can diffuse throughout the photographic film unit without becoming immobilized in undesired areas.

In U.S. Published Patent Application No. B351,673, published Jan. 28, 1975, nondiffusible dye releasing compounds are disclosed. Among the various dye moieties disclosed which can be released are "metal complexed dyes". No specific structures are shown, however.

In U.S. Pat. Nos. 3,931,144; 3,932,380; 3,942,987; 3,954,476; 4,001,209; 4,013,633 and 4,013,635, various nondiffusible azo dye-releasing compounds are disclosed. The released dyes, however, are not disclosed as being metallized or metallizable.

The April 1977 edition of *Research Disclosure*, pages 32 through 39, discloses various nondiffusible dye-releasing compounds and various metallized azo dye fragments. Such premetallized dyes are large molecules which diffuse more slowly than unmetallized dyes, resulting in long access times for image formation. In any event, the specific compounds employed in the instant invention are not disclosed, however.

U.S. Pat. Nos. 3,086,005; 3,492,287 and 3,985,499 disclose various azo dyes, U.S. Pat. Nos. 2,348,417; 2,495,244; and 2,830,042 and French Pat. Nos. 1,124,882 and 1,200,358 disclose various dyes from azopyridines, while U.S. Pat. Nos. 2,868,775; 2,938,895; 3,097,196; 3,691,161; and 3,875,139; British Pat. No. 899,758; and an article entitled "The Irgalan Dyes—Neutral-Dyeing Metal-Complex Dyes" by Guido Schetty, J. Soc. Dyers and Colourists, Volume 71, 1955, pages 705 through 724, disclose various metal complexed dyes. Again, however, neither the specific compounds employed in the instant invention nor the results obtained therewith are disclosed.

It would be desirable to provide improved dye-releasing compounds containing chelating dye moieties, so that the dye which is released imagewise during processing can diffuse to an image-receiving layer containing metal ions to form a metal-complexed, dye transfer image having better hues, rapid diffusion rates and shorter access times than those of the prior art, as well as good stability to heat, light and chemical reagents.

A photographic element in accordance with the invention comprises a support having thereon at least one photosensitive silver halide emulsion layer having associated therewith a nondiffusible compound having a releasable pyridylazopyrazole or pyrimidylazopyrazole dye moiety containing:

(a) in the ortho position of the azopyrazole moiety a metal chelating group, a salt thereof or a hydrolyzable precursor thereof, and (b) a ballasted carrier moiety which is capable of releasing the diffusible azo dye under alkaline conditions such as, for example, as a function (either direct or inverse) of development of the silver halide emulsion layer.

In a preferred embodiment of the invention, the pyridylazopyrazole and pyrimidylazopyrazole dye-releasing compounds may be represented by the formula:

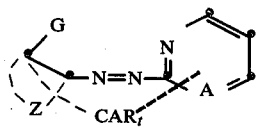

wherein:

G is a metal chelating group (any group which will donate a pair of electrons to a metal ion) or a salt thereof (e.g., an alkali metal salt, a quaternary ammonium salt, etc) or a hydrolyzable precursor thereof (e.g., a hydrolyzable acyl or ester group), e.g, hydroxy; amino; carboxy; sulfonamido; sodium carboxylate; sulfamoyl; a hydrolyzable ester group having the formula —OCOR, —OCOOR, —OCONR$_2$ or —COOR, wherein each R is an alkyl group having 1 to about 4 carbon atoms, such as methyl, ethyl, isopropyl, butyl and the like, or an aryl group having 6 to about 8 carbon atoms, such as phenyl, etc;

A represents C or N;

CAR represents said ballasted carrier moiety;

Z represents the atoms necessary to complete a pyrazole ring attached to the azo group in the 4-position; and t is a positive integer of 1 to 2.

In a further preferred embodiment of the invention, the pyridylazopyrazole and pyrimidylazopyrazole dye-releasing compounds may be represented by the formula:

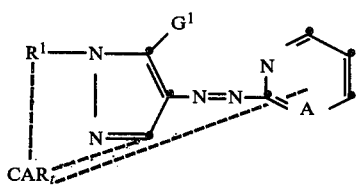

wherein:

A represents C or N;

CAR represents said ballasted carrier moiety;

t is a positive integer of 1 to 2;

G$^1$ represents OH or NH$_2$; and $R^1$ represents an alkylene (including substituted alkylene) group of 1 to about 8 carbon atoms or an arylene (including substituted arylene) group of 6 to about 8 carbon atoms.

Good yellow dyes are obtained in this embodiment when the pyrazole ring is substituted in the 3-position with a methyl group and said CAR is attached to the pyrazole ring through a phenylene group in the 1-position. Other substituents may also be present in either of the two rings such as alkyl of 1 to 6 carbon atoms, alkoxy, halogens, solubilizing groups such as sulfonamido, sulfamoyl, carboxy, sulfo, etc.

The absorption spectra of the azo dyes according to the invention, when metallized in the image-receiving layer, are narrow banded, have bright hues and give good color reproduction quality. This is to be contrasted with dyes having hydroxyl radicals substituted on aryl or heterocycyl nuclei at positions ortho and ortho-prime to the azo linkage, such as described in the above-mentioned U.S. Pat. No. 3,196,014, which generally give rather broad spectra.

There is great latitude in selecting a CAR moiety which is attached to the pyridylazopyrazole or pyrimidylazopyrazole dye-releasing compounds described above. Depending upon the nature of the ballasted carrier selected, various groups may be needed to attach or link the carrier moiety to the dye. Such linkage groups are considered to be a part of the CAR moiety in the above definition. It should also be noted that when the dye moiety is released from the compound, cleavage may take place in such a position that part or all of a linking group if one is present, and even part of the ballasted moiety may be transferred to the image-receiving layer along with the dye moiety. In any event, the dye nucleus as shown above can be thought of as the "minimum" which is transferred.

CAR moieties useful in the invention are described in U.S. Pat. Nos. 3,227,550; 3,628,952; 3,227,552; and 3,844,785 (dye released by chromogenic coupling); U.S. Pat. Nos. 3,443,939 and 3,443,940 (dye released by intramolecular ring closure); U.S. Pat. Nos. 3,698,897 and 3,725,062 (dye released from hydroquinone derivatives); U.S. Pat. No. 3,728,113 (dye released from a hydroquinonylmethyl quaternary salt); U.S. Pat. No. 3,719,489 and 3,443,941 (silver ion induced dye release); and U.S. Pat. Nos. 3,245,789 and 3,980,497; Canadian Patent 602,607; British Pat. No. 1,464,104; *Research Disclosure* 14447, April 1976; and commonly assigned copending U.S. application Ser. No. 775,025, filed Mar. 7, 1977 of Chasman et al (dye released by miscellaneous mechanisms), the disclosures of which are hereby incorporated by reference.

In a further preferred embodiment of the invention, the ballasted carrier moiety or CAR as described above may be represented by the following formula:

(Ballast—Carrier—Link)— wherein:
(a) Ballast is an organic ballasting radical of such molecular size and configuration as to render the compound nondiffusible in a photographic element during development in an alkaline processing composition;
(b) Carrier is an oxidizable acyclic, carbocyclic or heterocyclic moiety (see "The Theory of the Photographic Process", by C. E. K. Mees and T. H. James, Third Edition, 1966, pages 282 to 283), e.g., moieties containing atoms according to the following configuration:

$$a(-C=C)_b-$$

wherein:
b is a positive integer of 1 to 2; and
a represents the radicals OH, SH, NH—, or hydrolyzable precursors thereof; and (c) Link represents a group which upon oxidation of said Carrier moiety is capable of being hydrolytically cleaved to release the diffusible azo dye. For example, Link may be the following groups:

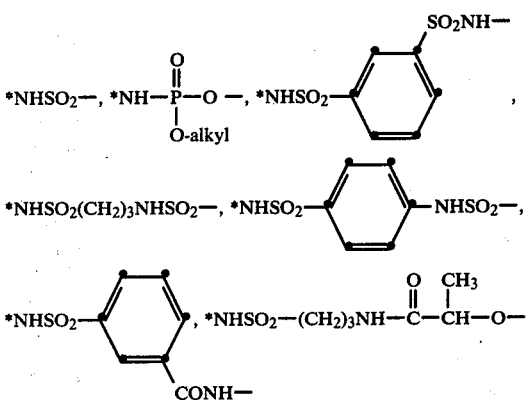

wherein * represents the position of attachment to Carrier.

The Ballast group in the above formula is not critical as long as it confers nondiffusibility to the compound. Typical Ballast groups include long-chain alkyl radicals linked directly or indirectly to the compound as well as aromatic radicals of the benzene and naphthalene series indirectly attached or fused directly to the rings, etc. Useful Ballast groups generally have at least 8 carbon atoms such as substituted or unsubstituted alkyl groups of 8 to 22 carbon atoms, a carbamoyl radical having 8 to 30 carbon atoms such as —CONH(CH$_2$)$_4$—O—C$_6$H$_3$(C$_5$H$_{11}$)$_2$, —CON(C$_{12}$H$_{25}$)$_2$, etc, a keto radical having 8 to 30 carbon atoms such as —CO—C$_{17}$H$_{35}$, —CO—C$_6$H$_4$(t—C$_{12}$H$_{25}$), etc.

For specific examples of Ballast-Carrier-Link moieties useful as the CAR moiety in this invention, reference is made to the November 1976 edition of *Research Disclosure*, pages 68 through 74, and the April 1977 edition of *Research Disclosure*, pages 32 through 39, the disclosures of which are hereby incorporated by reference.

In a highly preferred embodiment of the invention, the ballasted carrier moiety or CAR in the above formulas is a group having the formula:

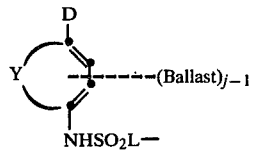

NHSO$_2$L— wherein:
(a) Ballast is an organic ballasting radical of such molecular size and configuration (e.g., simple organic groups or polymeric groups) as to render the compound nondiffusible in a photographic element during development in an alkaline processing composition;

(b) D is $OR^2$ or $NHR^3$ wherein $R^2$ is hydrogen or a hydrolyzable moiety and $R^3$ is hydrogen or a substituted or unsubstituted alkyl group of 1 to 22 carbon atoms such as methyl, ethyl, hydroxyethyl, propyl, butyl, secondary butyl, tert-butyl, cyclopropyl, 4-chlorobutyl, cyclobutyl, 4-nitroamyl hexyl, cyclohexyl, octyl, decyl, octadecyl, dodecyl, benzyl, phenethyl, etc. (when $R^3$ is an alkyl group of greater than 8 carbon atoms, it can serve as a partial or sole Ballast);

(c) Y represents the atoms necessary to complete a benzene nucleus, a naphthalene nucleus, or a 5 to 7 membered heterocyclic ring such as pyrazolone, pyrimidine, etc;

(d) j is a positive integer of 1 to 2 and is 2 when D is $OR^2$ or when $R^3$ is hydrogen or an alkyl group of less than 8 carbon atoms; and (e) L is a linking group is $[X—(NR^4—J)_q]_m—$ or $X—J—NR^4—$ wherein:

(i) X represents a bivalent linking group of the formula $—R^5—L'_n—R^5_p—$ where each $R^5$ can be the same or different and each represents an alkylene radical having 1 to about 8 carbon atoms, such as methylene, hexylene and the like; a phenylene radical; or a substituted phenylene radical having 6 to about 9 carbon atoms, such as methoxy phenylene;

(ii) L' represents a bivalent radical selected from oxy, imino, carbonyl, carboxamido, carbamoyl, sulfonamido, ureylene, sulfamoyl, sulfinyl or sulfonyl;

(iii) n is an integer of 0 or 1;

(iv) p is 1 when n equals 1 and p is 1 or 0 when n equals 0, provided that when p is 1 the carbon content of the sum of both $R^5$ radicals does not exceed 14 carbon atoms;

(v) $R^4$ represents a hydrogen atom, or an alkyl radical having 1 to about 6 carbon atoms;

(vi) J represents a bivalent radical selected from sulfonyl or carbonyl;

(vii) q represents an integer of 0 or 1; and (viii) m represents an integer of 0, 1 or 2.

Especially good results are obtained in the above formula when D is OH, j is 2, Y is a naphthalene nucleus, G is OH, CAR is attached to the pyrazole ring in the 1-position and the pyrazole ring is substituted in the 3-position with a methyl group.

Examples of the CAR moiety in this highly preferred embodiment are disclosed in U.S. Published Patent Application No. B351,673; U.S. Pat. No. 3,928,312; French Pat. No. 2,284,140; and German Pat. Nos. 2,406,664; 2,613,005; and 2,505,248, the disclosures of which are hereby incorporated by reference, and include the following:

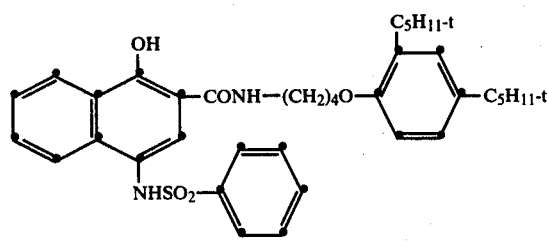

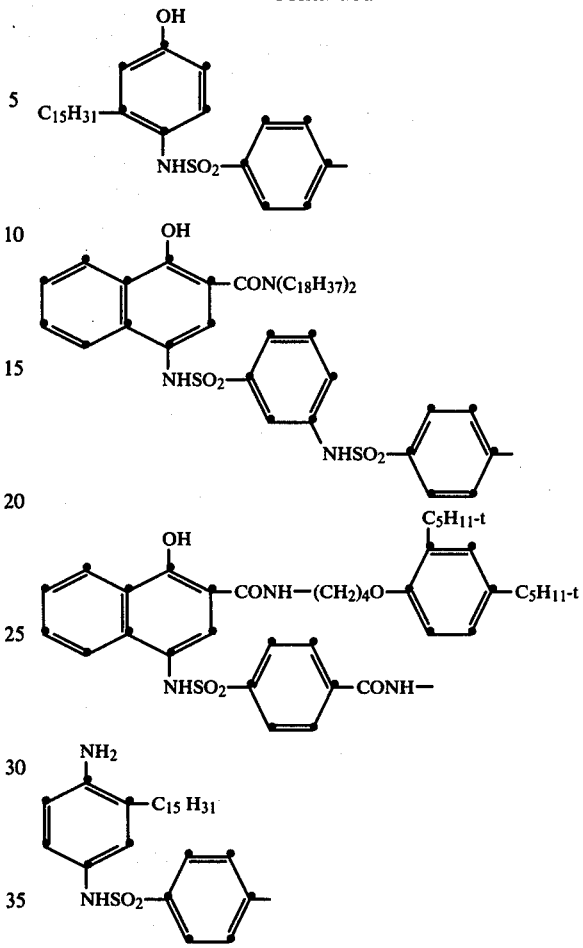

In another highly preferred embodiment of the invention, the ballasted carrier moiety or CAR in the above formulas is such that the diffusible azo dye is released as an inverse function of development of the silver halide emulsion layer under alkaline conditions. This is ordinarily referred to as positive-working dye-release chemistry. In one of these embodiments, the ballasted carrier moiety or CAR in the above formulas may be a group having the formula:

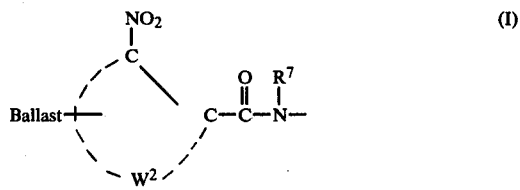

(I)

wherein:

Ballast is an organic ballasting radical of such molecular size and configuration as to render the compound nondiffusible in a photographic element during development in an alkaline processing composition;

$W^2$ represents at least the atoms necessary to complete a benzene nucleus (including various substituents thereon); and $R^7$ is an alkyl (including substituted alkyl) radical having 1 to about 4 carbon atoms.

Examples of the CAR moiety in this formula I include the following:

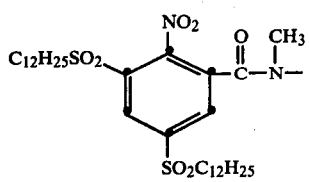

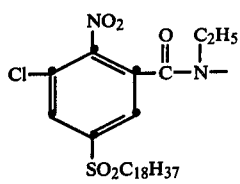

In a second embodiment of positive-working dye-release chemistry as referred to above, the ballasted carrier moiety or CAR in the above formulas may be a group having the formula:

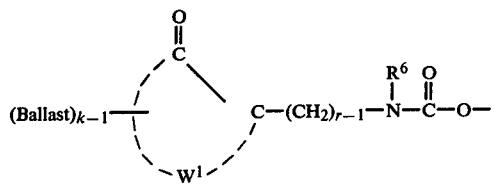

wherein:

Ballast is an organic ballasting radical of such molecular size and configuration as to render the compound nondiffusible in a photographic element during development in an alkaline processing composition;

$W^1$ represents at least the atoms necessary to complete a quinone nucleus (including various substituents thereon);

r is a positive integer of 1 or 2;

$R^6$ is an alkyl (including substituted alkyl) radical having 1 to about 40 carbon atoms or an aryl (including substituted aryl) radical having 6 to about 40 carbon atoms; and k is a positive integer of 1 to 2 and is 2 when $R^6$ is a radical of less than 8 carbon atoms.

Examples of the CAR moiety in this formula II include the following:

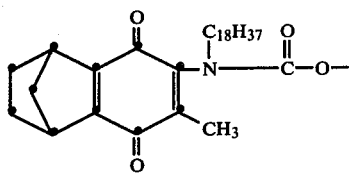

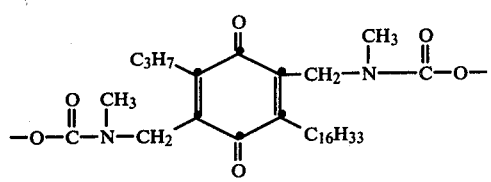

In using the compounds in formulas I and II above, they are employed in a photographic element similar to the other nondiffusible dye-releasers described previously. Upon reduction of the compound as a function of silver halide development under alkaline conditions, the metallizable azo dye is released. In this embodiment, conventional negative-working silver halide emulsions, as well as direct-positive emulsions, can be employed. For further details concerning these particular CAR moieties, including synthesis details, reference is made to commonly assigned copending U.S. application Ser. No. 775,025 of Chasman et al., filed Mar. 7, 1977, the disclosure of which is hereby incorporated by reference.

In a third embodiment of positive-working dye-release chemistry as referred to above, the ballasted carrier moiety or CAR in the above formulas may be a group having the formula:

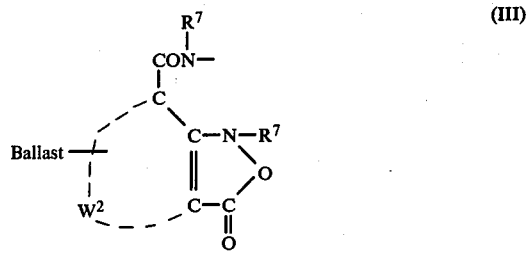

wherein:

Ballast, $W^2$ and $R^7$ are as defined for formula I above.

Examples of the CAR moiety in this formula III include the following:

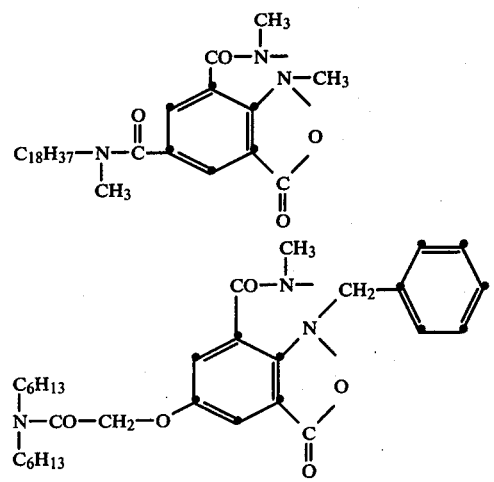

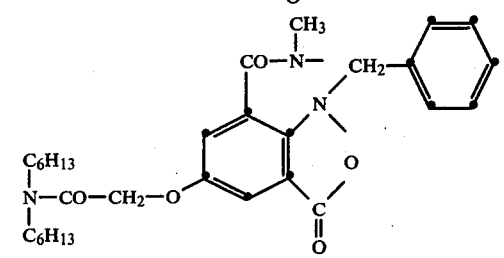

For further details concerning this particular CAR moiety, including synthesis details, reference is made to commonly assigned copending U.S. application Ser. No. 534,966 of Hinshaw et al, filed Dec. 20, 1974, the disclosure of which is hereby incorporated by reference.

In a fourth embodiment of positive-working dye-release chemistry as referred to above, the ballasted carrier moiety or CAR in the above formulas may be a group having the formula:

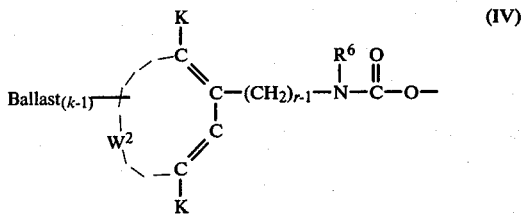

wherein:

Ballast, r, $R^6$ and k are as defined for formula II above;

$W^2$ is as defined for formula I above; and

K is OH or a hydrolyzable precursor thereof.

Examples of the CAR moiety in this formula IV include the following:

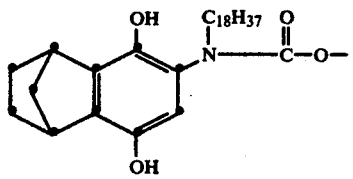

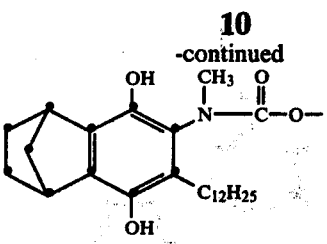

For further details concerning this particular CAR moiety, including synthesis details, reference is made to U.S. Pat. No. 3,980,479 of Fields et al, issued Sept. 14, 1976, the disclosure of which is hereby incorporated by reference.

A bivalent linking group, e.g., L or X as defined above, may be used, if desired, to link the CAR moiety described in formulas I through IV above to the dye moiety previously described.

Representative compounds included within the scope of the invention include the following:

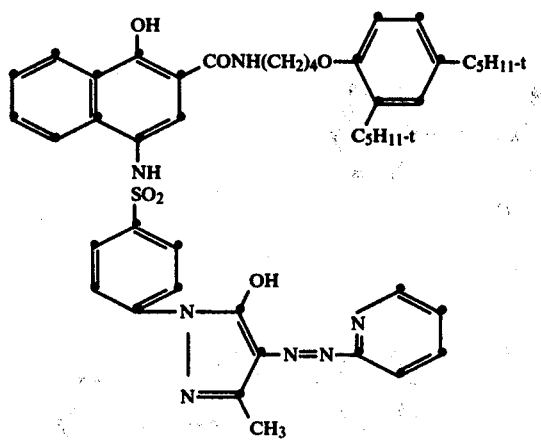

(1)

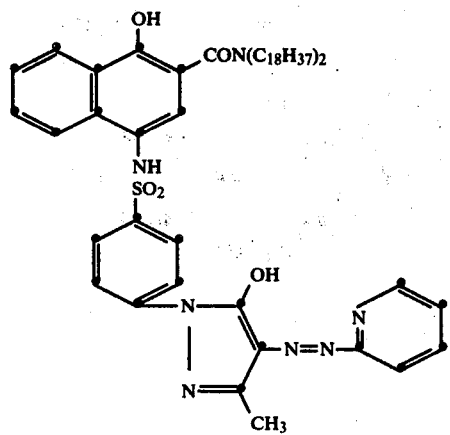

(2)

(3)
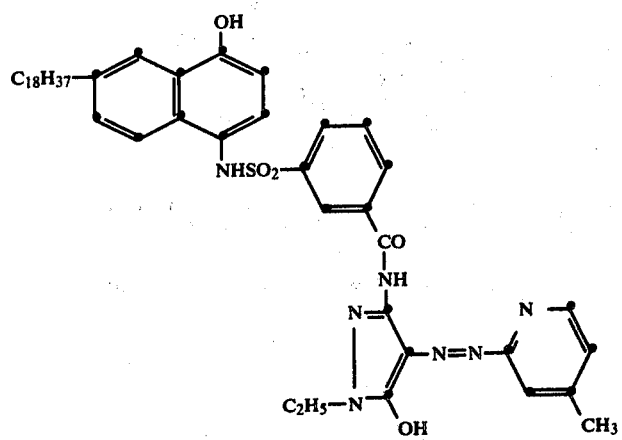
(4)
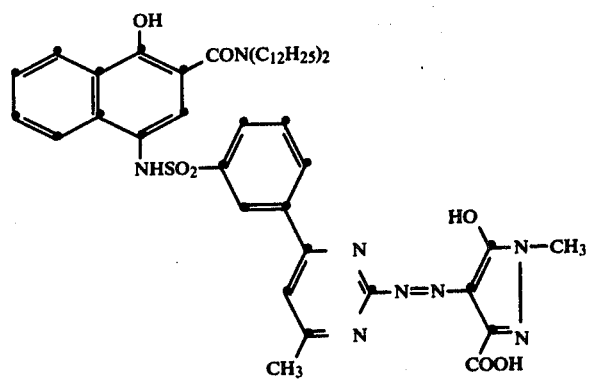
(5)
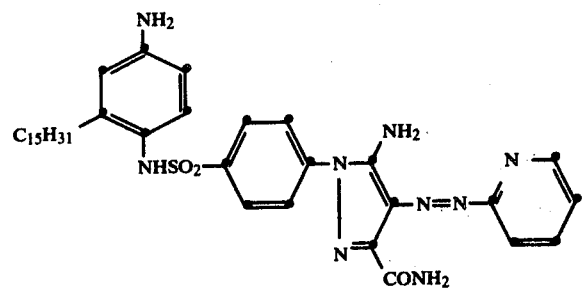
(6)
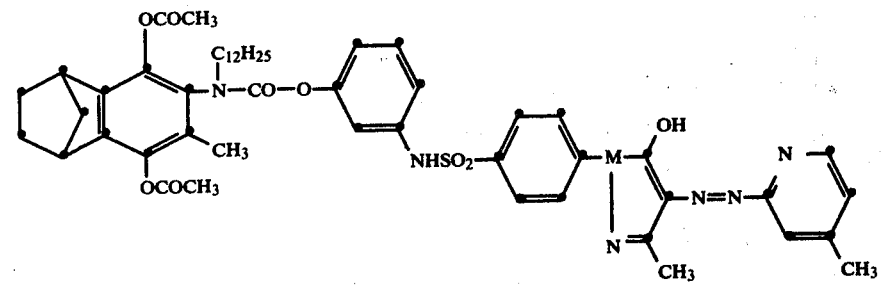
(7)
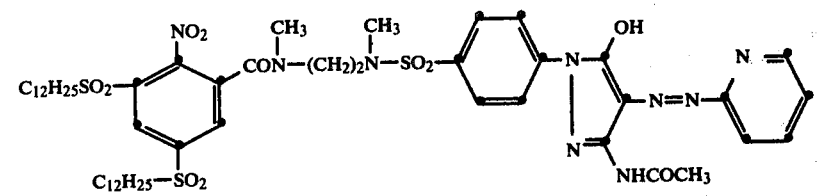
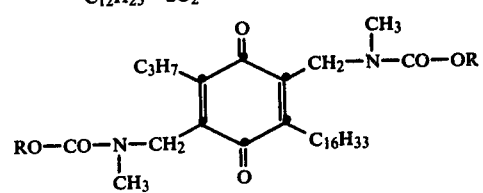

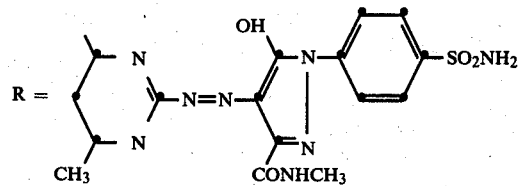
(8)

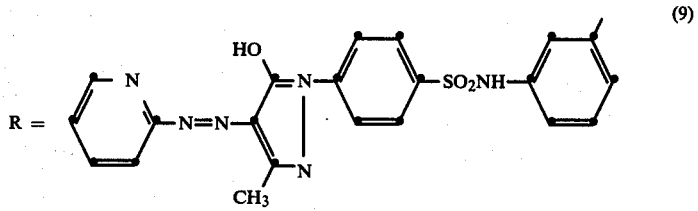
(9)

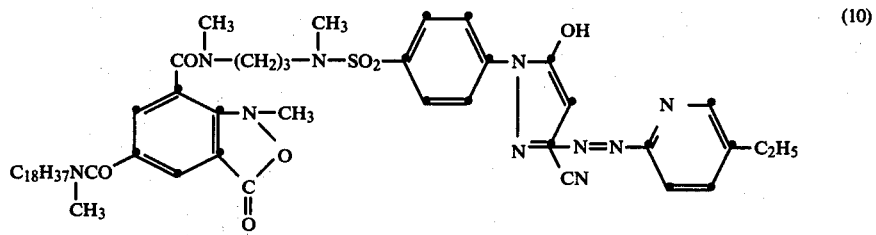
(10)

A process for producing a photographic transfer image in color according to the invention comprises:

(a) treating an imagewise-exposed photographic element as described above with an alkaline processing composition in the presence of a silver halide developing agent to effect development of each of the exposed silver halide emulsion layers, (b) the dye-releasing compound then releasing the diffusible azo dye as described above imagewise as a function of the development of each of the silver halide emulsion layers;

(c) at least a portion of the imagewise distribution of the azo dye diffusing to a dye image-receiving layer; and (d) contacting the imagewise distribution of azo dye with metal ions, thereby forming a metal-complexed azo dye transfer image.

In another preferred embodiment of the invention, a process for producing a photographic transfer image in color according to the invention comprises:

(a) treating an imagewise-exposed photographic element as described above wherein CAR in the compound has the formula:

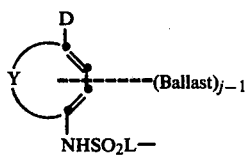

D, Y, L and j being defined as above,
with an alkaline processing composition in the presence of a silver halide developing agent to effect development of each of the exposed silver halide emulsion layers, thereby oxidizing the developing agent;

(b) the oxidized developing agent thereby cross-oxidizing the dye-releasing compound;

(c) the cross-oxidized dye-releasing compound then cleaving as a result of alkaline hydrolysis to release the diffusible azo dye imagewise as a function of the imagewise exposure of each of the silver halide emulsion layers;

(d) at least a portion of the imagewise distribution of the azo dye diffusing to a dye image-receiving layer; and (e) contacting the imagewise distribution of azo dye with metal ions, thereby forming a metal-complexed azo dye transfer image.

The tridentate azo dye ligand which is released from the dye-releasing compounds in accordance with the present invention will form a coordination complex in the image-receiving layer with polyvalent metal ions. The metal ions can be present in the image-receiving layer itself or in a layer adjacent thereto or the image-receiving layer can be contacted with metal ions in a bath after diffusion of the dye has taken place. Metal ions most useful in the invention are those which are essentially colorless when incorporated into the image-receiving element, are inert with respect to the silver halide layers, react readily with the released dye to form a complex of the desired hue, are tightly coordinated to the dye in the complex, have a stable oxidation state, and form a dye complex which is stable to heat, light and chemical reagents. In general, good results are obtained with polyvalent metal ions such as copper (II), zinc (II), nickel (II), platinum (II), palladium (II) and cobalt (II) ions.

For example, it is believed that the coordination complex which is formed from the tridentate azo dye ligand according to the invention in one of the preferred embodiments thereof has the following structure:

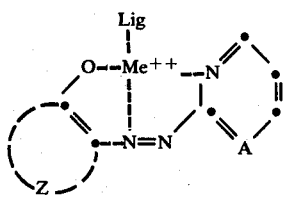

where Z and A are defined as above, Me is metal and Lig is one or more ligand groups depending upon the coordination number of the metal ion, such as $H_2O$, Cl, pyridine, etc.

Thus, in accordance with another embodiment of the invention, a photographic element is provided which comprises a support having thereon a coordination complex of a polyvalent metal ion and a compound having the formula:

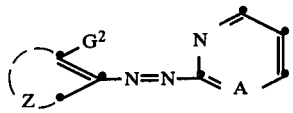

wherein Z and A are as described previously, and $G^2$ is a metal chelating group, as described above. The element usually contains a photographic mordant or image-receiving layer to bind the dye or coordination complex thereto. The structures shown above may also, of course, be substituted in the same manner as described above for the starting compounds from which they are released, e.g., the pyrazole ring may be substituted in the 3-position with a methyl group, etc.

It will be appreciated that, after processing the photographic element described above, there remains in it after transfer has taken place an imagewise distribution of azo dye in addition to developed silver. A color image comprising residual nondiffusible compound may be obtained in this element if the residual silver and silver halide are removed by any conventional manner well known to those skilled in the photographic art, such as a bleach bath followed by a fix bath, a bleach-fix bath, etc. Such a retained dye image should normally be treated with metal ions to metallize the dyes to increase their light fastness and shift their spectral absorption to the intended region. The imagewise distribution of azo dye may also diffuse out of the element into these baths, if desired, rather than to an image-receiving element. If a negative-working silver halide emulsion is employed in certain preferred photosensitive elements, described above, then a positive color image, such as a reflection print, a color transparency or motion picture film, may be produced in this manner. If a direct-positive silver halide emulsion is employed in such photosensitive elements, then a negative color image may be produced.

The photographic element in the above-described process can be treated with an alkaline processing composition to effect or initiate development in any manner. A preferred method for applying processing composition is by use of a rupturable container or pod which contains the composition. In general, the processing composition employed in this invention contains the developing agent for development, although the composition could also just be an alkaline solution where the developer is incorporated in the photographic element, image-receiving element or process sheet, in which case the alkaline solution serves to activate the incorporated developer.

A photographic film unit which can be processed in accordance with this invention is adapted to be processed by passing the unit between a pair of juxtaposed pressure-applying members, such as would be found in a camera designed for in-camera processing, and comprises:

(1) a photographic element as described above;
(2) a dye image-receiving layer; and
(3) means for discharging an alkaline processing composition within the film unit, such as a rupturable container which is adapted to be positioned during processing of the film unit so that a compressive force applied to the container by the pressure-applying members will effect a discharge of the container's contents within the film unit;

the film unit containing a silver halide developing agent.

In the embodiment described above, the dye image-receiving layer may itself contain metal ions or the metal ions may be present in an adjacent layer, so that the tridentate azo dye ligand which is released will form a coordination complex therewith. The dye thus becomes immobilized in the dye image-receiving layer and metallized at the same time. Alternatively, the dye image in the dye image-receiving layer may be treated with a solution containing metal ions to effect metallization. The formation of the coordination complex shifts the absorption of the dye to the desired hue, usually to longer wavelengths, which have a different absorption than that of the initial dye-releasing compound. If this shift is large enough, then the dye-releasing compound may be incorporated in a silver halide emulsion layer without adversely affecting its sensitivity.

The dye image-receiving layer in the above-described film unit can be located on a separate support adapted to be superposed on the photographic element after exposure thereof. Such image-receiving elements are generally disclosed, for example, in U.S. Pat. No. 3,362,819. When the means for discharging the processing composition is a rupturable container, it is usually positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

The dye image-receiving layer in the above-described film unit can also be located integral with the photographic element between the support and the lowermost photosensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer and dye images are formed as a function of development which diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention can be employed is disclosed in Belgian Pat. No. 757,959. In this embodiment, the support for the photographic element is transparent and is coated with the image-receiving layer, a substantially opaque, light-reflective layer and the photosensitive layer or layers described above. A rupturable container containing an alkaline processing composition and an opacifier is positioned adjacent the top layer and a transparent top sheet which has thereon a neutralizing layer and a timing layer. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images are formed as a result of development which diffuse to the image-receiving layer to provide a positive, right-reading image which is viewed through the transparent support on the opaque reflecting layer background. For further details concerning the format of this particular integral film unit, reference is made to the above-mentioned Belgian Pat. No. 757,959.

Still other useful integral formats in which this invention can be employed are described in U.S. Pat. Nos. 3,415,644; 3,415,645; 3,415,646; 3,647,437; and 3,635,707. In most of these formats, a photosensitive silver halide emulsion is coated on an opaque support and a dye image-receiving layer is located on a separate transparent support superposed over the layer outermost from the opaque support. In addition, this transparent support also preferably contains a neutralizing layer and a timing layer underneath the dye image-receiving layer.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photosensitive silver halide negative emulsion layer. The film unit contains a silver halide solvent, preferably in a rupturable container with the alkaline processing composition.

The film unit or assembly used in the present invention may be used to produce positive images in single- or multicolors. In a three-color system, each silver halide emulsion layer of the film assembly will have associated therewith a dye-releasing compound which releases a dye possessing a predominant spectral absorption within the region of the visible spectrum to which said silver halide emulsion is sensitive (initially or after forming the coordination complex), i.e., the blue-sensitive silver halide emulsion layer will have a yellow or yellow-forming dye-releaser associated therewith, the green-sensitive silver halide emulsion layer will have a magenta or magenta-forming dye-releaser associated therewith, and the red-sensitive silver halide emulsion layer will have a cyan or cyan-forming dye-releaser associated therewith, at least one of the dye-releasers being a compound in accordance with the present invention. The dye-releaser associated with each silver halide emulsion layer may be contained either in the silver halide emulsion layer itself or in a layer contiguous to the silver halide emulsion layer.

The concentration of the dye-releasing compounds that are employed in the present invention may be varied over a wide range, depending upon the particular compound employed and the results which are desired. For example, the dye-releasers of the present invention may be coated in layers by using coating solutions containing between about 0.5 and about 8 percent by weight of the dye-releaser distributed in a hydrophilic film-forming natural material or synthetic polymer, such as gelatin, polyvinyl alcohol, etc, which is adapted to be permeated by aqueous alkaline processing composition.

Depending upon which CAR is used in the present invention, a variety of silver halide developing agents can be employed. In certain embodiments of the invention, any silver halide developing agent can be employed as long as it cross-oxidizes with the dye-releasers described herein. The developer may be employed in the photosensitive element to be activated by the alkaline processing composition. Specific examples of developers which can be employed in this invention include:

N-methylaminophenol
Phenidone (1-phenyl-3-pyrazolidone)
Dimezone (1-phenyl-4,4-dimethyl-3-pyrazolidone)
aminophenols
1-phenyl-4-methyl-4-hydroxymethyl-3-pyrazolidone
N,N-diethyl-p-phenylenediamine
N,N,N',N'-tetramethyl-p-phenylenediamine
3-methyl-N,N-diethyl-p-phenylenediamine
3-methoxy-N-ethyl-N-ethoxy-p-phenylenediamine, etc.

The non-chromogenic developers in this list are preferred, however, since they avoid any propensity of staining the dye image-receiving layer.

In a preferred embodiment of the invention, the silver halide developer employed in the process becomes oxidized upon development and reduces silver halide to silver metal. The oxidized developer then cross-oxidizes the dye-releasing compound. The product of cross-oxidation then undergoes alkaline hydrolysis, thus releasing an imagewise distribution of diffusible azo dye which then diffuses to the receiving layer to provide the dye image. The diffusible moiety is transferable in alkaline processing composition either by virtue of its self-diffusivity or by its having attached to it one or more solubilizing groups, for example, a carboxy, sulpho, sulphonamido, hydroxy or morpholino group.

In using the dye-releasing compounds according to the invention which produce diffusible dye images as a function of development, either conventional negative-working or direct-positive silver halide emulsions may be employed. If the silver halide emulsion employed is a direct-positive silver halide emulsion, such as an internal-image emulsion designed for use in the internal image reversal process or a fogged, direct-positive emulsion such as a solarizing emulsion, which is developable in unexposed areas, a positive image can be obtained in certain embodiments on the dye image-receiving layer. After exposure of the film unit, the alkaline processing composition permeates the various layers to initiate development of the exposed photogsensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-catalyzed reaction to release the dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a pH-lowering layer in the film unit or image-receiving unit lowers the pH of the film unit or image receiver to stabilize the image.

Internal-image silver halide emulsions useful in this invention are described more fully in the November 1976 edition of *Research Disclosure*, pages 76 through 79, the disclosure of which is hereby incorporated by reference.

The various silver halide emulsion layers of a color film assembly employed in this invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layer for absorbing or filtering blue radiation that may be transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention can be of the type disclosed in U.S. Pat. Nos. 2,543,181; 2,643,886; 2,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye-releasers are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November 1976 edition of *Research Disclosure*, the disclosure of which is hereby incorporated by reference.

Any material can be employed as the image-receiving layer in this invention as long as the desired function of mordanting or otherwise fixing the dye images is obtained. The particular material chosen will, of course, depend upon the dye to be mordanted. Suitable materials are disclosed on pages 80 through 82 of the November 1976 edition of *Research Disclosure*, the disclosure of which is hereby incorporated by reference.

Use of a pH-lowering material in the film units employed in this invention will usually increase the stability of the transferred image. Generally, the pH-lowering material will effect a reduction in the pH of the image layer from about 13 or 14 to at least 11 and preferably 5 to 8 within a short time after imbibition. Suitable materials and their functioning are disclosed on pages 22 and 23 of the July 1974 edition of *Research Disclosure* and pages 35 through 37 of the July 1975 edition of *Research Disclosure*, the disclosures of which are hereby incorporated by reference.

A timing or inert spacer layer can be employed in the practice of this invention over the pH-lowering layer which "times" or controls the pH reduction as a function of the rate at which alkali diffuses through the inert spacer layer. Examples of such timing layers and their functioning are disclosed in the *Research Disclosure* articles mentioned in the paragraph above concerning pH-lowering layers.

The alkaline processing composition employed in this invention is the conventional aqueous solution of an alkaline material, e.g., alkali metal hydroxides or carbonates such as sodium hydroxide, sodium carbonate or an amine such as diethylamine, preferably processing a pH in excess of 11, and preferably containing a developing agent as described previously. Suitable materials and addenda frequently added to such compositions are disclosed on pages 79 and 80 of the November 1976 edition of *Research Disclosure*, the disclosure of which is hereby incorporated by reference.

While the alkaline processing composition used in this invention can be employed in a rupturable container, as described previously, to conveniently facilitate the introduction of processing composition into the film unit, other methods of inserting processing composition into the film unit could also be employed, e.g., interjecting processing solution with communicating members similar to hypodermic syringes which are attached either to a camera or camera cartridge. The processing composition may also be applied by means of a swab or by dipping in a bath, if so desired.

The alkaline solution-permeable, substantially opaque, light-reflective layer employed in certain embodiments of photographic film units used in this invention are described more fully in the November 1976 edition of *Research Disclosure*, page 82, the disclosure of which is hereby incorporated by reference.

The supports for the photographic elements used in this invention can be any material as long as it does not deleteriously affect the photographic properties of the film unit and is dimensionally stable. Typical flexible sheet materials are described on page 85 of the November 1976 edition of *Research Disclosure*, the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone.

The silver halide emulsions useful in this invention, both negative-working and direct-positive ones, are well known to those skilled in the art and are described in *Product Licensing Index*, Volume 92, December 1971, publication 9232, page 107, paragraph I, "Emulsion types"; they may be chemically and spectrally sensitized as described on page 107, paragraph III, "Chemical sensitization", and pages 108 and 109, paragraph XV, "Spectral sensitization", of the above article; they can be protected against the production of fog and can be stabilized against loss of sensitivity during keeping by employing the materials described on page 107, paragraph V, "Antifoggants and stabilizers", of the above article; they can contain development modifiers, hardeners, and coating aids as described on pages 107 and 108, paragraph IV, "Development modifiers"; paragraph VII, "Hardeners"; and paragraph XII, "Coating aids", of the above article; they and other layers in the photographic elements used in this invention can contain plasticizers, vehicles and filter dyes described on page 108, paragraph XI, "Plasticizers and lubricants", and paragraph VIII, "Vehicles", and page 109, paragraph XVI, "Absorbing and filter dyes", of the above article; they and other layers in the photographic elements used in this invention may contain addenda which are incorporated by using the procedures described on page 109, paragraph XVII, "Methods of addition", of the above article; and they can be coated by using the various techniques described on page 109, paragraph XVIII, "Coating procedures", of the above article, the disclosures of which are hereby incorporated by reference.

The term "nondiffusing" used herein has the meaning commonly applied to the term in photography and denotes materials that for all practical purposes do not migrate or wander through organic colloid layers, such as gelatin, in the photographic elements of the invention in an alkaline medium and preferably when processed in a medium having a pH of 11 or greater. The same meaning is to be attached to the term "immobile". The term "diffusible" as applied to the materials of this invention has the converse meaning and denotes materials having the property of diffusing effectively through the colloid layers of the photographic elements in an alkaline medium in the presence of "nondiffusing" materials. "Mobile" has the same meaning.

The term "associated therewith" as used herein is intended to mean that the materials can be in either the same or different layers so long as the materials are accessible to one another.

EXAMPLE 1—PREPARATION OF COMPOUND 1

5.3 g (0.014 mole) of 1-(p-chlorosulfonylphenyl)-3-methyl-4-(2-pyridylazo)-2-pyrazolin-5-one was added in portions to a well-stirred, nitrogen-flushed solution of 6.9 g (0.014 mole) of 4-amino-N-[4-(2,4-di-t-pentylphenoxy)butyl]-1-hydroxy-2-naphthamide in 300 ml of methylene chloride. After 15 minutes of stirring, a solution of 1.26 g (0.016 mole) of pyridine was added with stirring under nitrogen. The solution was stirred overnight at room temperature. The product mixture is washed with 100 ml of 1 N HCl, followed by 100 ml of $H_2O$. The acid and water washes were back-washed with methylene chloride. The organic solutions were combined and dried with anhydrous sodium sulfate. The solvent was stripped off in vacuo. The resulting oily solid was recrystallized from 300 ml of isopropyl alcohol containing 50 ml of ethyl alcohol. Yield: 4.8 g (41 percent), m.p. 176° to 178°.

Intermediates:

1-(p-Chlorosulfonylphenyl)-3-methyl-4-(2-pyridylazo)-2-pyrazolin-5-one. 9.0 g (0.025 mole) of 3-methyl-4-(2-pyridylazo)-1-(p-sulfophenyl)-2-pyrazolin-5-one was added in portions with stirring to 70 ml of $SOCl_2$. To this suspension was added dropwise 3 ml of dimethylformamide. The mixture was stirred overnight. The resulting solution was poured slowly with vigorous stirring into 500 ml of ice water. The solid product was filtered and pressed dry. This product was slurried in 50 percent tetrahydrofuran/ethyl ether, filtered, and dried to obtain 5.3 g (56 percent) of orange solid.

3-Methyl-4-(2-pyridylazo)-1-(4-sulfophenyl)-2-pyrazolin-5-one. 41.0 g (0.10 mole) of 4,4-dibromo-3-methyl-1-(4-sulfophenyl)-2-pyrazolin-5-one, which can be prepared according to the method of Machiele, U.S. Pat. No. 3,952,009 (Example 1), and 16.0 g (0.15 mole) of 2-hydrazinopyridine were combined in 180 ml of water. The mixture was heated on the steam bath a total of six hours. After a few minutes of heating, the solution goes to a very thick slurry. The mixture was cooled somewhat, 10 ml of concentrated HCl were added, and the orange solid was isolated by suction filtration. After washing once with tetrahydrofuran, twice with ether, and drying, the yield of dye was 17.8 g (50 percent).

EXAMPLE 2—PHOTOGRAPHIC TESTS

A single-color integral-imaging-receiver element was prepared by coating successively on a polyester film support (1) a metallizing layer comprising gelatin (1.08 g/m$^2$) and nickel sulfate hexahydrate (1.16 g/m$^2$), (2) a receiving layer comprising a mixture of gelatin and poly(4-vinylpyridine) (each at 2.15 g/m$^2$), (3) a reflecting layer comprising titanium dioxide and gelatin in a 6.25/1 ratio, (4) an opaque layer of carbon dispersed in gelatin, (5) a layer comprising gelatin and a dispersion of the dye-releasing compound in Table I (0.78 g/m$^2$), (6) a layer of a blue-sensitive internal image emulsion as described in Evans, U.S. Pat. No. 3,761,276 (1.85 g/m$^2$ gelatin), with fogging agents NA-16 and H-25 of Leone et al, U.S. Pat. No. 4,030,925, issued June 21, 1977, and 5-octadecylhydroquinone-2-sulfonic acid (16 g/mole Ag), (7) a layer of didodecylhydroquinone (1.29 g/m$^2$) dispersed in gelatin (1.61 g/m$^2$), and (8) a gelatin overcoat layer. When no metal ion was used to chelate the dye, the entire layer (1) was omitted. Layers 1 and 2 above form no part of this invention, as they are the subject of an invention by my coworkers, Brust, Hamilton and Wilkes.

This integral element was exposed to a multicolor test object, then processed by spreading between it and a processing cover sheet at 22° C. a viscous processing composition, by passing the "transfer" sandwich between a pair of juxtaposed rollers so that the liquid layer was about 75 μm. The cover sheet comprised a poly(ethylene terephthalate) film support having thereon:

(1) an acid layer comprising 15.5 g/m$^2$ of poly(n-butyl acrylate-co-acrylic acid) (70 weight percent acrylic acid); and (2) a timing layer comprising 5-(2-cyanoethylthio)-1-phenyltetrazole (0.11 g/m$^2$), cellulose acetate (40 percent acetyl) (4.31 g/m$^2$) and poly(styrene-co-maleic anhydride) (0.11 g/m$^2$); and (3) a timing layer comprising poly(acrylonitrile-co-vinylidene chloride-co-acrylic acid) (2.15 g/m$^2$).

The processing composition comprised:

| | |
|---|---|
| potassium hydroxide | 47.0 g |
| sodium hydroxide | 3.4 g |
| methylhydroquinone | 0.1 g |
| t-butylhydroquinone | 0.3 g |
| 4-hydroxymethyl-4-methyl-1-phenyl pyrazolidone | 12.0 g |
| 5-methyl-1,2,3-benzotriazole | 3.8 g |
| carboxymethylcellulose | 66.8 g |

-continued

| | |
|---|---|
| dispersant | 8.8 g |
| sodium sulfite (anhydrous) | 1.0 g |
| benzyl alcohol | 1.0 g |
| carbon | 171.0 g |
| distilled water to total volume 1 liter | |

The yellow dye reflection density in the unexposed areas (i.e., $D_{max}$ areas) was measured at selected intervals up to 24 hours. The density at $\lambda_{max}$ after 4 minutes was determined from these plots. Spectrophotometric curves were obtained on the final $D_{max}$, the $\lambda_{max}$ (i.e., the wavelength at $D_{max}$) and "half band width" (½ BW) being recorded in Table I. The "half band width" is the wavelength range at half the $D_{max}$, a measure of purity of hue: the narrower the ½ BW, the purer the hue. The light stability was determined by exposing part of the strip to a high intensity daylight (5000 foot-candles) light source for 2 days.

TABLE I
DYE RELEASERS

| Compound Number | Density at $\lambda_{max}$ after 4 minutes time (sec) to reach a density of 1.0 | Hue $\lambda_{max}$ (nm) | ½ BW (nm) | Metal, Me$^{++}$ | Light Stability $D_o$ | $\Delta D$ |
|---|---|---|---|---|---|---|
| 1 | 0.95 | 450 | 88 | Ni | 1.00 | +.02 |
| 2 | 1.52 | 450 | 94 | Ni | 1.00 | −.02 |

EXAMPLE 3 — RELEASED DYES

3-Methyl-4-(2-pyridylazo)-1-(4-sulfamoylphenyl)-2-pyrazolin-5-one,

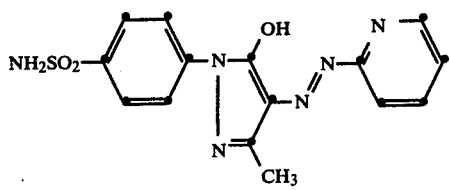

25 ml of a 10 percent aqueous solution of ammonia was cooled to 0°. To this was added in portions 1.0 g (2.7 mmole) of 1-(4-chlorosulfonylphenyl)-3-methyl-4-(2-pyridylazo)-2-pyrazolin-5-one. After the addition was complete, the mixture was stirred an additional half hour at 0° C. After filtering and drying, the yield of orange solid was 0.93 g (98 percent).

Other dyes were prepared from 2-hydrazinopyridine and the corresponding 4,4-dibromo-2-pyrazolin-5-one as in Example 1.

EXAMPLE 4—SPECTRAL DATA ON DYES

Table II shows the hue, diffusion, and light stability data for other released dyes. The data was obtained as follows:

The dye was dissolved at a concentration of $5 \times 10^{-3}$ molar in 0.5 M sodium hydroxide solution containing hydroxyethylcellulose (Natrosol 250H, 30 g/l) as a thickener. It was spread in a thin layer between a cover sheet of polyester film support and a receiving element which consists of a polyester film support and a layer containing a mordant mixture of gelatin (2.2 g/m$^2$) and a latex, poly(styrene-co-N-benzyl-N,N-dimethyl-N-vinylbenzylammonium sulfate-co-divinylbenzene), (2.2 g/m$^2$). The thickness of the dye layer is selected to give an optical density on the receiving element of generally around 1.5. When the dye is adsorbed to the mordant, the sheets are peeled apart, and the dyed sheet is washed and dried.

For metallizing the dyes with nickel (II) ions, the above receiving element was modified to include bis-(acetylacetonato)nickel (II) (0.65 g/m$^2$) in the mordant layer.

For metallizing the dyes with copper (II) ions, a sample of the dyed receiving element was treated for five minutes with a solution 0.5 M in cupric ion: 6.0 g cupric nitrate (·3H$_2$O), 75 g tartaric acid, 91 ml of 0.5 M aqueous dipotassium hydrogen phosphate, 109 ml 1.5 M aqueous potassium dihydrogen phosphate, sodium hydroxide to adjust the pH to 6.0, all per liter of solution. The strips were then washed and dried.

Hue: The wavelength at the maximum density ($\lambda_{max}$) of the spectrophotometric curves is recorded in the table along with the "half band width" (½ BW), the wavelength range of the curve at half the maximum density. Because the spectra of many of these yellow dyes fall out of the visible region below 400 nm, the starred values in Table II describe twice (2X) the range (nm) between the $\lambda$ at $D_{max}$ and the long $\lambda$ limit of the curve at ½ $D_{max}$. A narrow "half band width" generally designates a pure hue.

Light Stability: The above dye receiving elements were subjected to 5 days of a high density daylight (5000 foot-candles) fading test. The loss in density ($\Delta D$) was monitored spectrophotometrically.

Compounds 17, 18 and 19 were each dissolved in dilute sodium hydroxide solution. A strip of the receiving element as above was soaked in the solution until a density of about 0.9 was obtained. The strips were buffered to pH 7.0, those to be metallized were soaked in dilute cupric acetate, and all were washed and dried. The same fading test as above was carried out for 4 days.

Under the conditions of the Experiments, the hue and light stability of the dyes were highly dependent on the presence of and specific selection of the metal ion. Nickel (II) ion produced highly stable images with a bright yellow hue and narrow absorption bands.

TABLE II
RELEASED DYES

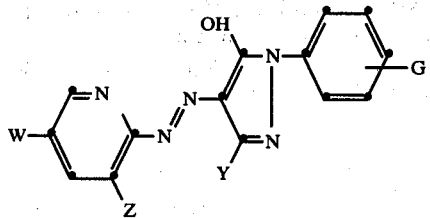

| Compound Number | G | Y | W | Z | Hue λ_max (nm) | ½ BW (nm) | Chelating Metal ion Me++ (or H+) | Light stability D_o | ΔD |
|---|---|---|---|---|---|---|---|---|---|
| 12 | H | CH₃ | H | H | 420 | 108* | None | 1.44 | −.24 |
|  |  |  |  |  | 448 | 94* | Ni | 1.32 | 0 |
|  |  |  |  |  | 418 | 132* | Cu | 1.27 | −.44 |
| 13 | 4-SO₃H | CH₃ | H | H | 417 | 116* | None | 1.68 | −.29 |
|  |  |  |  |  | 445 | 88* | Ni | 1.64 | −.02 |
|  |  |  |  |  | 416 | 138* | Cu | 1.56 | −.49 |
| 14 | 4-SO₃H | CH₃ | H | CH₃ | 431 | 108* | None | 1.70 | −.37 |
|  |  |  |  |  | 456 | 96* | Ni | 1.62 | −.02 |
|  |  |  |  |  | 455 | 116* | Cu | 1.65 | −.55 |
| 15 | 4-SO₃H | CONH₂ | H | H | — | — | — | — | — |
| 16 | 4-SO₂NH₂ | CH₃ | H | H | 415 | 118* | None | 1.43 | −.38 |
|  |  |  |  |  | 448 | 86* | Ni | 1.40 | −.01 |
|  |  |  |  |  | 420 | 132* | Cu | 1.60 | −.23 |
| 17 | H | H | H | H | 446 | — | None | 0.81 | −.08 |
|  |  |  |  |  | 454 | — | Cu | 0.93 | −.14 |
| 18 | H | H | CH₃ | H | 445 | — | None | 0.83 | −.10 |
|  |  |  |  |  | 450 | — | Cu | 0.89 | −.04 |
| 19 | H | H | Br | H | 456 | — | None | 0.92 | −.06 |
|  |  |  |  |  | 454 | — | Cu | 0.93 | −.02 |

The invention has been described in detail with particular reference to preferred embodiments thereof, but it will be understood that variations and modifications can be effected within the spirit and scope of the invention.

What is claimed is:

1. A photographic element comprising a support having thereon at least one photosensitive silver halide emulsion layer, said emulsion layer having associated therewith a nondiffusible compound having a releasable 4-(2-pyridylazo)pyrazole or 4-(2-pyrimidylazo)pyrazole dye moiety, said compound containing:
   (a) in the ortho position of the azopyrazole moiety a metal chelating group, a salt thereof or a hyderolyzable precursor thereof, and
   (b) a ballasted carrier moiety which is capable of releasing said diffusible dye as a function of development of said silver halide emulsion layer under alkaline conditions.

2. The photographic element of claim 1 wherein said compound has the formula:

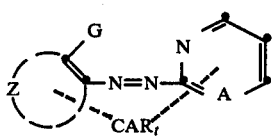

wherein:
   A represents C or N;
   G is a metal chelating group, a salt thereof or a hydrolyzable precursor thereof;
   CAR represents said ballasted carrier moiety;
   Z represents the atoms necessary to complete a pyrazole ring attached to the azo group in the 4-position; and
   t is a positive integer of 1 to 2.

3. The photographic element of claim 2 wherein CAR is a group having the formula:

(Ballast—Carrier—Link)— wherein:
   (a) Ballast is an organic ballasting radical of such molecular size and configuration as to render said compound nondiffusible in said photographic element during development in an alkaline processing composition;
   (b) Carrier is an oxidizable acyclic, carbocyclic or heterocyclic moiety; and
   (c) Link represents a group which upon oxidation of said carrier moiety is capable of being hydrolytically cleaved to release said diffusible dye.

4. The photographic element of claim 3 wherein the Carrier moiety contains atoms according to the following configuration:

a (—C=C)_b— wherein:
   b is a positive integer of 1 to 2; and
   a represents the radicals OH, SH, NH—, or hydrolyzable precursors thereof.

5. The photographic element of claim 2 wherein CAR is a group having the formula:

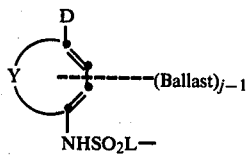

wherein:

(a) Ballast is an organic ballasting radical of such molecular size and configuration as to render said compound nondiffusible in said photographic element during development in an alkaline processing composition;

(b) D is $OR^2$ or $NHR^3$ wherein $R^2$ is hydrogen or a hydrolyzable moiety and $R^3$ is hydrogen or a substituted or unsubstituted alkyl group of 1 to 22 carbon atoms;

(c) Y represents the atoms necessary to complete a benzene nucleus, a naphthalene nucles, or a 5 to 7 membered heterocyclic ring;

(d) j is a positive integer of 1 to 2 and is 2 when D is $OR^2$ or when $R^3$ is hydrogen or an alkyl group of less than 8 carbon atoms; and (e) L is a linking group which is $[X-(NR^4-J)_q]_m-$ or $X-J-NR^4-$ wherein:

(i) X represents a bivalent linking group of the formula $-R^5-L'_n-R^5_p-$ where each $R^5$ can be the same or different and each represents an alkylene radical having 1 to about 8 carbon atoms; a phenylene radical; or a substituted phenylene radical having 6 to about 9 carbon atoms;

(ii) L' represents a bivalent radical selected from oxy, carbonyl, carboxamido, carbamoyl, sulfonamido, ureylene, sulfamoyl, sulfinyl or sulfonyl;

(iii) n is an integer of 0 or 1;

(iv) p is 1 when n equals 1 and p is 1 or 0 when n equals 0, provided that when p is 1 the carbon content of the sum of both $R^5$ radicals does not exceed 14 carbon atoms;

(v) $R^4$ represents a hydrogen atom, or an alkyl radical having 1 to about 6 carbon atoms;

(vi) J represents a bivalent radical selected from sulfonyl or carbonyl;

(vii) q represents an integer of 0 or 1; and (viii) m represents an integer of 0, 1 or 2.

6. The photographic element of claim 5 wherein D is OH, j is 2, Y is a naphthalene nucleus, G is OH, CAR is attached to the pyrazole ring through a phenylene group in the 1-position, and the pyrazole ring is substituted in the 3-position with a methyl group.

7. The photographic element of claim 1 wherein said compound has the formula:

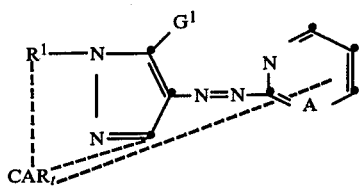

wherein:
A represents C or N;
$G^1$ represents OH or $NH_2$;
CAR represents said ballasted carrier moiety;
$R^1$ represents an alkylene or substituted alkylene group of 1 to about 8 carbon atoms or an arylene or substituted arylene group of 6 to about 8 carbon atoms; and
t is a positive integer of 1 to 2.

8. The photographic element of claim 7 wherein the pyrazole ring is substituted in the 3-position with a methyl group and said CAR is attached to the pyrazole ring through a phenylene group in the 1-position.

9. The photographic element of claim 1 wherein said diffusible dye is released as an inverse function of said development of said silver halide emulsion layer under alkaline conditions.

10. The photographic element of claim 9 wherein said ballasted carrier moiety is a group having the formula:

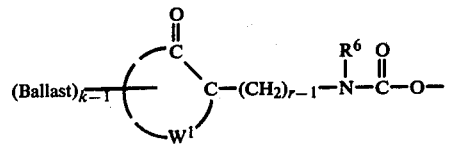

wherein:
Ballast is an organic ballasting radical of such molecular size and configuration as to render said compound nondiffusible in said photographic element during development in an alkaline processing composition;
$W^1$ represents at least the atoms necessary to complete a quinone nucleus;
r is a positive integer of 1 or 2;
$R^6$ is an alkyl radical having 1 to about 40 carbon atoms or an aryl radical having 6 to about 40 carbon atoms; and
k is a positive integer of 1 to 2 and is 2 when $R^6$ is a radical of less than 8 carbon atoms.

11. The photographic element of claim 9 wherein said ballasted carrier moiety is a group having the formula:

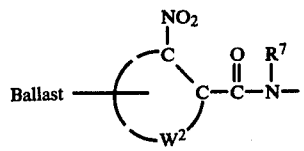

wherein:
Ballast is an organic ballasting radical of such molecular size and configuration as to render said compound nondiffusible in said photographic element during development in an alkaline processing composition;
$W^2$ represents at least the atoms necessary to complete a benzene nucleus; and
$R^7$ is an alkyl radical having 1 to about 4 carbon atoms.

12. The photographic element of claim 9 wherein said ballasted carrier moiety is a group having the formula:

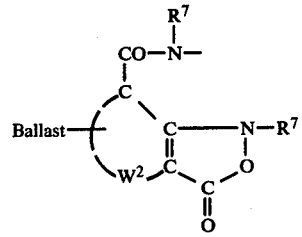

wherein:
Ballast is an organic ballasting radical of such molecular size and configuration as to render said compound nondiffusible in said photographic element during development in an alkaline processing composition;

W² represents at least the atoms necessary to complete a benzene nucleus; and

R⁷ is an alkyl radical having 1 to about 4 carbon atoms.

13. The photographic element of claim 9 wherein said ballasted carrier moiety is a group having the formula:

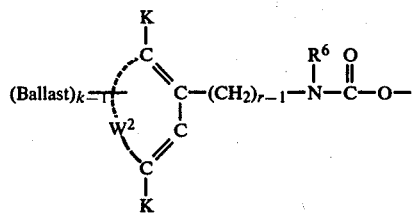

wherein:

Ballast is an organic ballasting radical of such molecular size and configuration as to render said compound nondiffusible in said photographic element during development in an alkaline processing composition;

W² represents at least the atoms necessary to complete a benzene nucleus;

r is a positive integer of 1 or 2;

R⁶ is an alkyl radical having 1 to about 40 carbon atoms or an aryl radical having 6 to about 40 carbon atoms;

k is a positive integer of 1 to 2 and is 2 when R⁶ is a radical of less than 8 carbon atoms; and K is OH or a hydrolyzable precursor thereof.

14. The photographic element of claim 1 wherein said dye-releasing compound is:

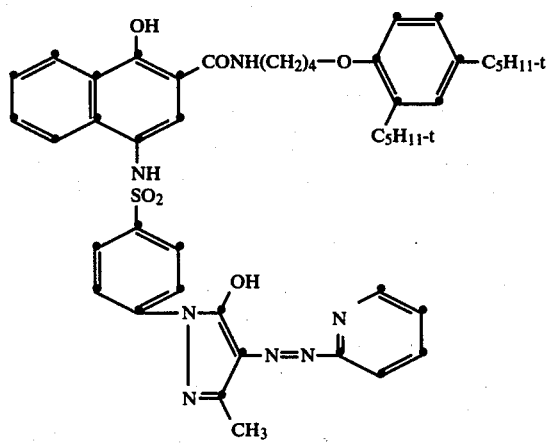

15. The photographic element of claim 1 wherein said dye-releasing compound is:

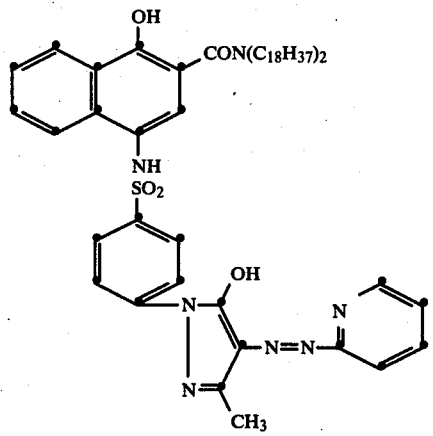

16. In a photographic assemblage comprising:
   (a) a support having thereon at least one photosensitive silver halide emulsion layer having associated therewith a dye image-providing material;
   (b) a dye image-receiving layer; and
   (c) an alkaline processing composition and means for discharging same within said assemblage;
said assemblage containing a silver halide developing agent, the improvement wherein said dye image-providing material is a nondiffusible compound having a releasable 4-(2-pyridylazo)pyrazole or 4-(2-pyrimidylazo)pyrazole dye moiety, said compound containing:
   (a) in the ortho position of the azopyrazole moiety a metal chelating group, a salt thereof or a hydrolyzable precursor thereof, and
   (b) a ballasted carrier moiety which is capable of releasing said diffusible dye as a function of development of said silver halide emulsion layer under alkaline conditions.

17. The photographic assemblage of claim 16 wherein said compound has the formula:

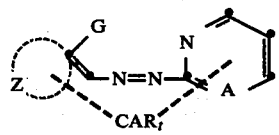

wherein:

A represents C or N;

G is a metal chelating group, a salt thereof or a hydrolyzable precursor thereof;

CAR represents said ballasted carrier moiety;

Z represents the atoms necessary to complete a pyrazole ring attached to the azo group in the 4-position; and t is a positive integer of 1 to 2.

18. The photographic assemblage of claim 17 wherein said CAR is a group having the formula:

wherein:

(a) Ballast is an organic ballasting radical of such molecular size and configuration as to render said compound nondiffusible in said photographic assemblage during development in an alkaline processing composition;

(b) Carrier is an oxidizable acyclic, carbocyclic or heterocyclic moiety; and
(c) Link represents a group which upon oxidation of said carrier moiety is capable of being hydrolytically cleaved to release said diffusible dye.

19. The photographic assemblage of claim 18 wherein the Carrier moiety contains atoms according to the following configuration:

$$a(-C=C)_b-$$

wherein:
b is a positive integer of 1 to 2; and
a represents the radicals OH, SH, NH—, or hydrolyzable precursors thereof.

20. The photographic assemblage of claim 16 wherein said compound has the formula:

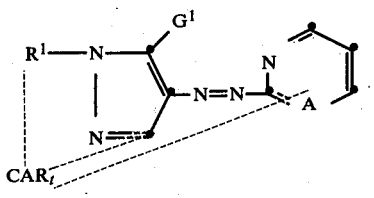

wherein:
A represents C or N;
$G^1$ represents OH or $NH_2$;
CAR represents said ballasted carrier moiety;
$R^1$ represents an alkylene or substituted alkylene group of 1 to about 8 carbon atoms or an arylene or substituted arylene group of 6 to about 8 carbon atoms; and
t is a positive integer of 1 to 2.

21. The photographic assemblage of claim 20 wherein the pyrazole ring is substituted in the 3-position with a methyl group and said CAR is attached to the pyrazole ring through a phenylene group in the 1-position.

22. The photographic assemblage of claim 16 wherein said dye image-receiving layer or a layer adjacent thereto contains metal ions.

23. The photographic assemblage of claim 22 wherein:
(a) said dye image-receiving layer is located between said support and said silver halide emulsion layer; and
(b) said assemblage also includes a transparent cover sheet over the layer outermost from said support.

24. The photographic assemblage of claim 23 wherein said cover sheet has thereon, in sequence, a neutralizing layer and a timing layer.

25. The photographic assemblage of claim 24 wherein said discharging means is a rupturable container containing said alkaline processing composition and an opacifying agent, said container being so positioned during processing of said assemblage that a compressive force applied to said container will effect a discharge of the container's contents between said transparent sheet and the layer outermost from said support.

26. The photographic assemblage of claim 22 wherein said support having thereon said photosensitive silver halide emulsion layer is opaque and said dye image-receiving layer is located on a separate transparent support superposed over the layer outermost from said opaque support.

27. The photographic assemblage of claim 26 wherein said transparent support has thereon, in sequence, a neutralizing layer, a timing layer, and said dye image-receiving layer.

28. In an integral photographic assemblage comprising:
(a) a photosensitive element comprising a transparent support having thereon the following layers in sequence: a dye image-receiving layer, an alkaline solution-permeable, light-reflective layer, an alkaline solution-permeable, opaque layer, a red-sensitive silver halide emulsion layer having a ballasted cyan dye releaser associated therewith, a green-sensitive silver halide emulsion layer having a ballasted magenta dye releaser associated therewith, and a blue-sensitive silver halide emulsion layer having a ballasted yellow dye releaser associated therewith;
(b) a transparent sheet superposed over said blue-sensitive silver halide emulsion layer and comprising a transparent support having thereon, in sequence, a neutralizing layer and a timing layer; and
(c) a rupturable container containing an alkaline processing composition and an opacifying agent which is so positioned during processing of said assemblage that a compressive force applied to said container will effect a discharge of the container's contents between said transparent sheet and said blue-sensitive silver halide emulsion layer; said assemblage containing a silver halide developing agent; the improvement wherein at least one of said ballasted dye releasers is a nondiffusible compound having a releasable 4-(2-pyridylazo)pyrazole or 4-(2-pyrimidylazo)pyrazole dye moiety, said compound containing:
(a) in the ortho position of the azopyrazole moiety a metal chelating group, a salt thereof or a hydrolyzable precursor thereof, and
(b) a ballasted carrier moiety which is capable of releasing said diffusible dye as a function of development of said silver halide emulsion layer under alkaline conditions.

29. The photographic assemblage of claim 28 wherein said compound has the formula:

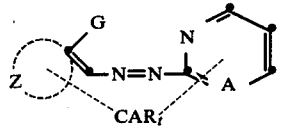

wherein:
A represents C or N;
G is a metal chelating group, a salt thereof or a hydrolyzable precursor thereof;
CAR represents said ballasted carrier moiety;
Z represents the atoms necessary to complete a pyrazole ring attached to the azo group in the 4-position; and
t is a positive integer of 1 to 2.

30. The photographic assemblage of claim 28 wherein said compound has the formula:

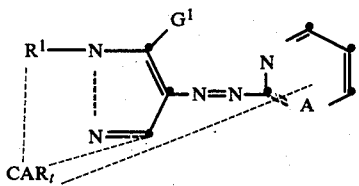

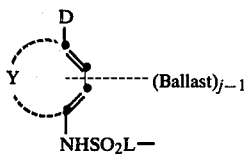

wherein:
A represents C or N;
$G^1$ represents OH or $NH_2$;
CAR represents said ballasted carrier moiety;
$R^1$ represents an alkylene or substituted alkylene group of 1 to about 8 carbon atoms or an arylene or substituted arylene group of 6 to about 8 carbon atoms; and
t is a positive integer of 1 to 2.

31. The photographic assemblage of claim 28 wherein said dye image-receiving layer or a layer adjacent thereto contains metal ions.

32. A process for producing a photographic transfer image in color in an imagewise-exposed photographic element comprising a support having thereon at least one photographic silver halide emulsion layer, said emulsion layer having associated therewith a nondiffusible compound having at least one releasable 4-(2-pyridylazo)pyrazole or 4-(2-pyrimidylazo)pyrazole dye moiety, said compound containing:

(A) in the ortho position of the azopyrazole moiety a metal chelating group, a salt thereof or a hydrolyzable precursor thereof, and (B) a ballasted carrier moiety which is capable of releasing said diffusible azo dye as a function of development of said silver halide emulsion layer under alkaline conditions, said process comprising:

(1) treating said photographic element with an alkaline processing composition in the presence of a silver halide developing agent to effect development of each of the exposed silver halide emulsion layers;

(2) said dye-releasing compound then releasing said diffusible azo dye imagewise as a function of said development of each of said silver halide emulsion layers;

(3) at least a portion of said imagewise distribution of said azo dye diffusing to a dye image-receiving layer; and (4) contacting said imagewise distribution of said azo dye with metal ions, thereby forming a metal-complexed, azo dye transfer image.

33. A process for producing a photographic transfer image in color in an imagewise-exposed photographic element comprising a support having thereon at least one photosensitive silver halide emulsion layer, said emulsion layer having associated therewith a nondiffusible compound having at least one releasable 4-(2-pyridylazo)pyrazole or 4-(2-pyrimidylazo)pyrazole dye moiety, said compound containing:

(A) in the ortho position of the azopyrazole moiety a metal chelating group, a salt thereof or a hydrolyzable precursor thereof, and (B) a ballasted carrier moiety which is capable of releasing said diffusible dye as a function of development of said silver halide emulsion layer under alkaline conditions, said ballasted carrier moiety being a group having the formula:

$$\begin{array}{c} D \\ | \\ Y \cdots (Ballast)_{j-1} \\ | \\ NHSO_2L- \end{array}$$

wherein:
(a) Ballast is an organic ballasting radical of such molecular size and configuration as to render said compound nondiffusible in said photographic element during development in an alkaline processing composition;

(b) D is $OR^2$ or $NHR^3$ wherein $R^2$ is hydrogen or a hydrolyzable moiety and $R^3$ is hydrogen or a substituted or unsubstituted alkyl group of 1 to 22 carbon atoms;

(c) Y represents the atoms necessary to complete a benzene nucleus, a naphthalene nucleus or a 5 to 7 membered heterocyclic ring;

(d) j is a positive integer from 1 to 2 and is 2 when D is $OR^2$ or when $R^3$ is hydrogen or an alkyl group of less than 8 carbon atoms; and (e) L is a linking group which is $[X-(NR^4-J)_q]_m-$ or $X-J-NR^4-$ wherein:

(i) X represents a bivalent linking group of the formula $-R^5-L'_n-R^5_p-$ where each $R^5$ can be the same or different and each represents an alkylene radical having 1 to about 8 carbon atoms; a phenylene radical; or a substituted phenylene radical having 6 to about 9 carbon atoms;

(ii) L' represents a bivalent radical selected from oxy, carbonyl, carboxamido, carbamoyl, sulfonamido, ureylene, sulfamoyl, sulfinyl or sulfonyl;

(iii) n is an integer of 0 or 1;

(iv) p is 1 when n equals 1 and p is 1 or 0 when n equals 0, provided that when p is 1 the carbon content of the sum of both $R^5$ radicals does not exceed 14 carbon atoms;

(v) $R^4$ represents a hydrogen atom, or an alkyl radical having 1 to about 6 carbon atoms;

(vi) J represents a bivalent radical selected from sulfonyl or carbonyl;

(vii) q represents an integer of 0 or 1; and (viii) m represents an integer of 0, 1 or 2; said process comprising:

(1) treating said photographic element with an alkaline processing composition in the presence of a silver halide developing agent to effect development of each of the exposed silver halide emulsion layers, thereby oxidizing said developing agent;

(2) said oxidized developing agent thereby cross-oxidizing said dye-releasing compound;

(3) said cross-oxidized dye-releasing compound then cleaving as a result of alkaline hydrolysis to release said diffusible azo dye imagewise as a function of said imagewise exposure of each of said silver halide emulsion layers;

(4) at least a portion of said imagewise distribution of said azo dye diffusing to a dye image-receiving layer; and (5) contacting said imagewise distribution of said azo dye with metal ions, thereby forming a metal-complexed, azo dye transfer image.

* * * * *